United States Patent [19]

Abuyama

[11] Patent Number: 4,557,585
[45] Date of Patent: Dec. 10, 1985

[54] RETURN SPEED CONTROL SYSTEM FOR USE IN A DOCUMENT SCANNING APPARATUS

[75] Inventor: Yasuo Abuyama, Ebina, Japan

[73] Assignee: Kabushiki Kaisha Toshiba, Kawasaki, Japan

[21] Appl. No.: 627,624

[22] Filed: Jul. 3, 1984

[30] Foreign Application Priority Data

Jul. 12, 1983 [JP] Japan .................... 58-126680

[51] Int. Cl.$^4$ ............... G03G 15/00; G03G 15/28
[52] U.S. Cl. ............................. 355/8; 355/3 R; 355/14 R
[58] Field of Search ............ 355/8, 3 R, 14 R, 14 C, 355/57, 51, 65, 66; 350/484, 486, 289, 342

[56] References Cited

U.S. PATENT DOCUMENTS

| | | | |
|---|---|---|---|
| 4,256,399 | 3/1981 | Ikeda | 355/8 |
| 4,324,485 | 4/1982 | Asakura et al. | 355/8 |
| 4,371,255 | 2/1983 | Satomi | 355/8 |
| 4,383,753 | 5/1983 | Inuzuka et al. | 355/8 |
| 4,413,900 | 11/1983 | Abe et al. | 355/8 |
| 4,422,756 | 12/1983 | Abe et al. | 355/57 |
| 4,484,810 | 11/1984 | Spinelli | 355/8 |
| 4,486,092 | 12/1984 | Ichinokawa | 355/57 X |

Primary Examiner—A. C. Prescott
Attorney, Agent, or Firm—Cushman, Darby & Cushman

[57] ABSTRACT

A return speed control system for use in a document scanning apparatus with a moving means moving relative to the document for optical scanning, comprising first and second detecting means and a control means. When the moving means is moving a backward, the first means detects the arrival of the moving means at a first position or an initialize position. When the moving means is in the backward motion, the second detecting means detects the arrival of the moving means at a second position separated by a predetermined distance from, the first position in the scanning direction. According to the operating state of the document scanning apparatus and the results of the detection by the first and second detecting means, the control means selectively sets up a high-speed backward mode, a low-speed backward mode, or a stop mode in the moving means. The predetermined distance which defines the second position is approximately the coasting distance of the moving means due to an inertia of the moving means generated when the operation mode of the moving means is switched from the high-speed backward mode to the low-speed backward mode. In this way, the control means controls the return speed of the moving means to be optimized according to the position of the moving means. Therefore, the return speed control system according to the present invention is free from the damage or distortion by the moving means, while it realizes the quick return of the moving means.

11 Claims, 26 Drawing Figures

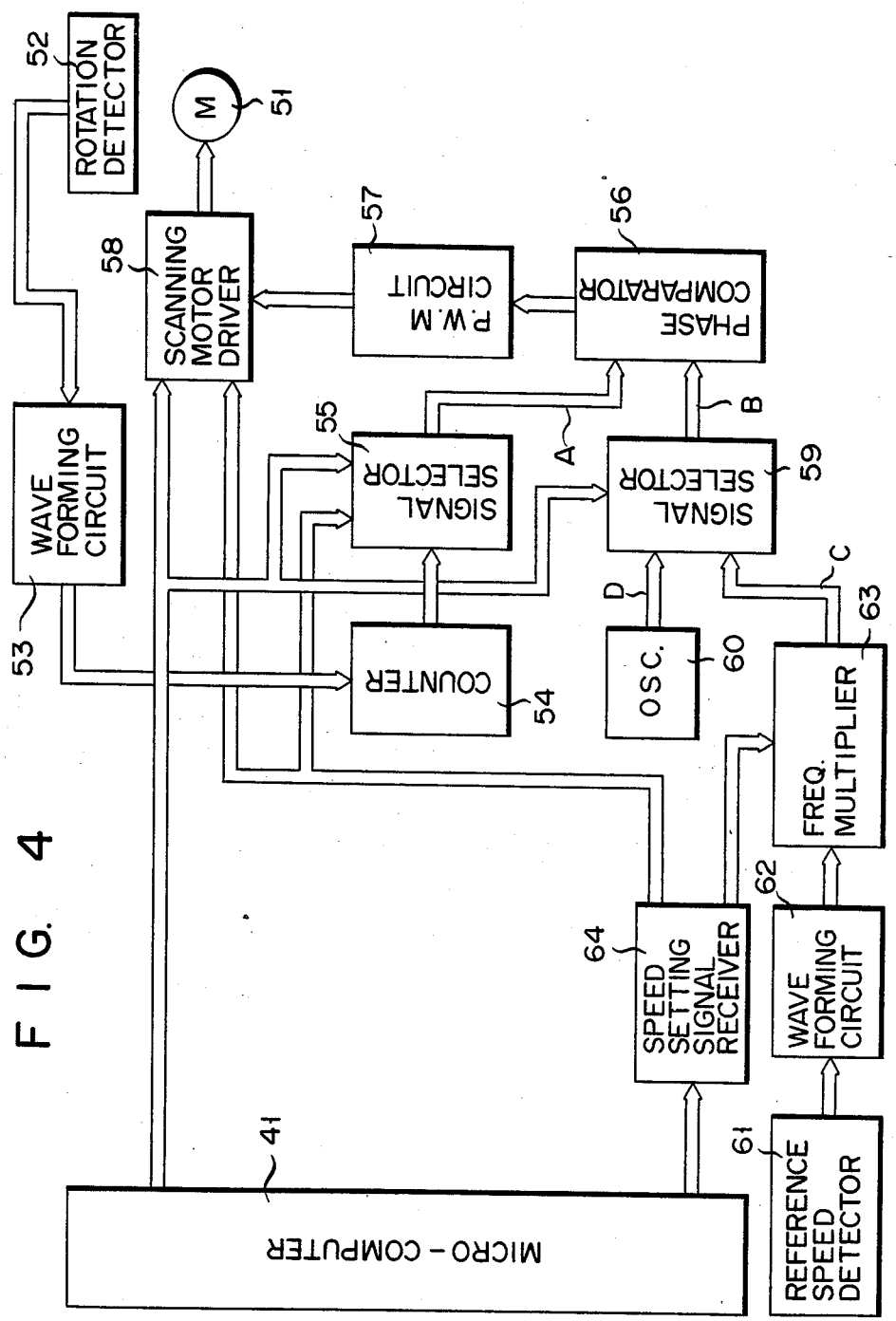

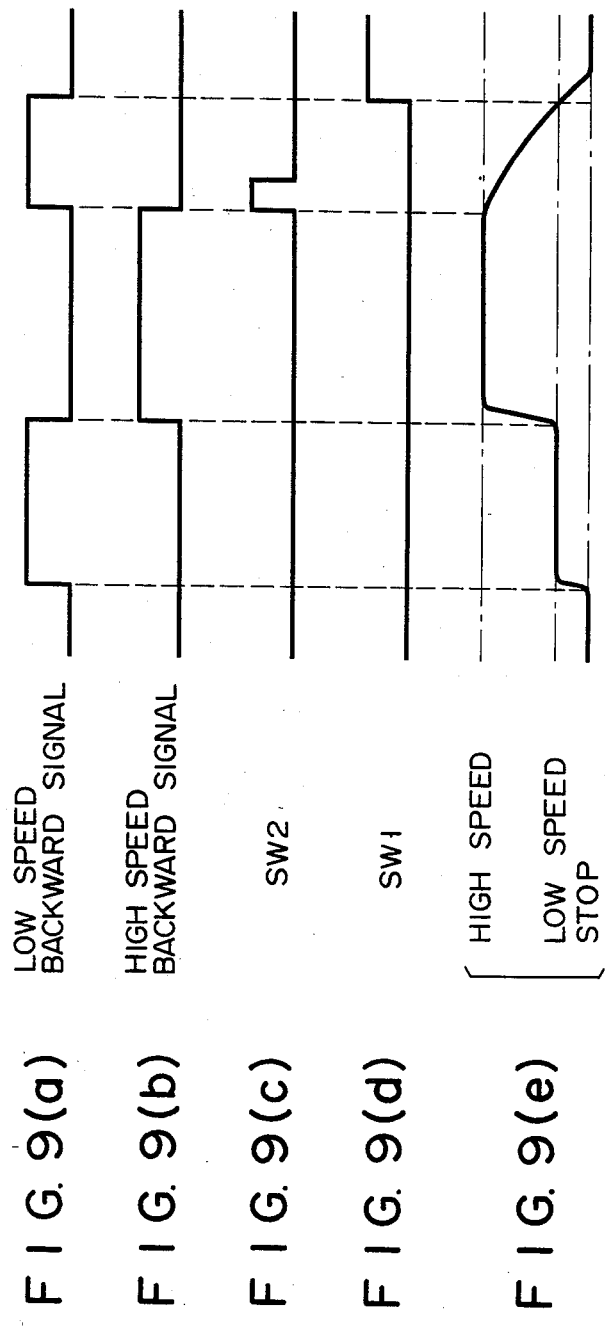

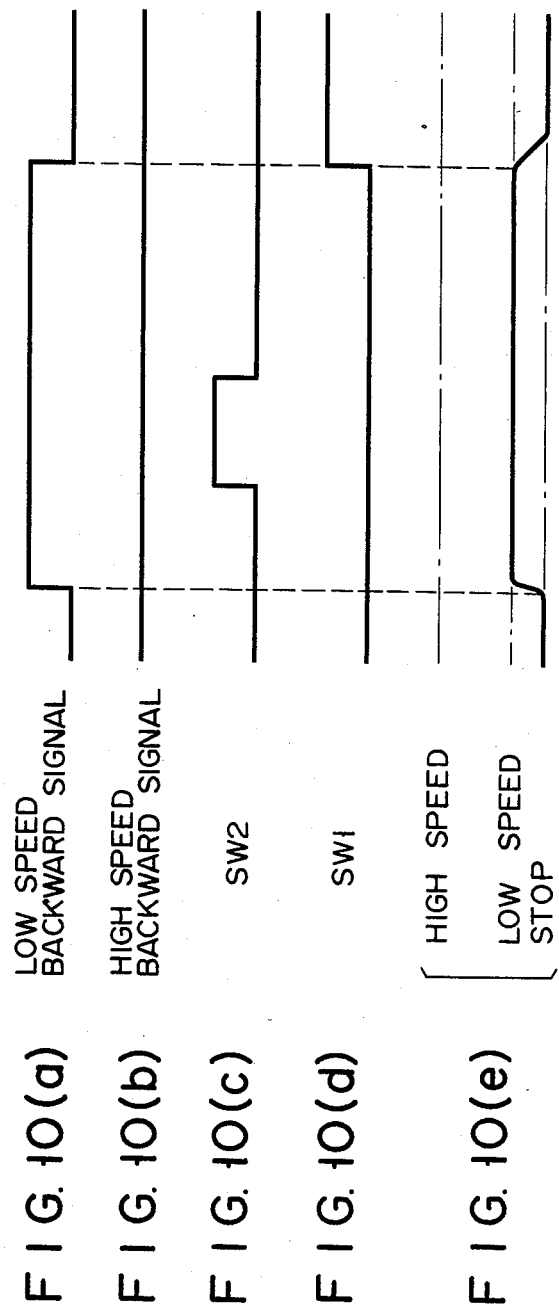

RETURN SPEED CONTROL SYSTEM FOR USE IN A DOCUMENT SCANNING APPARATUS

BACKGROUND OF THE INVENTION

The present invention relates to a return speed control system for use in a document scanning apparatus. More particularly, this invention relates to a return speed control system with a moving means for optically scanning a document placed on a document table of an image forming apparatus such as a copy machine.

In a copy machine, for example, the document scanning apparatus is generally classified into two types, a document table moving type and a document table fixed type. The latter type of document scanning apparatus is usually constructed such that a moving means containing an exposure lamp and a mirror moves in parallel with and along the document table. In this apparatus, the copying speed is one of the factors which can be improved. The best way to improve the copying speed is to increase the return speed of the moving means to be as fast as possible, because the return time taken for the return of the moving means never contributes to the copying operation itself.

Simply increasing the return speed, however, is not sufficient. For example, it hinders the smooth return of the moving means to its initializing or home position. If the moving means is abruptly and rapidly moved as it returns, after a short time, the drive force applied to the moving means is lost. If this happens, the inertia and resilient force still remain in the moving means after the drive force is lost, which causes the moving means to overrun the home position and to violently hit the member located near the home position. The great shock caused by the moving means hitting the member can possibly damage or destroy the exposure lamp and mirror of the moving means, and can distort or loosen the fixing portions of those components.

The damage or distortion of the moving means results in poor copy, e.g., deformation of the copied image, which makes it impossible to scan the document and thus to effect the copying operation.

The above problem is involved not only in the return operation, but also in the reset operation performed when the power is on. In the document table-fixed type of document scanning apparatus, the moving means must be at the home position at the start of copying. Accordingly, when the copy machine is in a copy ready mode before the copy operation starts, the moving means is usually at the home position. When the copy machine is in such a mode, the moving means is frequently displaced from the home position. Therefore, it is necessary to return the moving means to the home position before the copy operation begins.

Recently many copy machines have employed a frame halving structure for ease of maintenance. In this structure, the main frame is separable into two individual sections with respect to the paper transfer path of the machine. One of the sections may be hingedly turned for opening when trouble such as a paper jam occurs, so as to allow an operator to easily have access to the trouble spot in the machine to remove the paper jam. In this type of copy machine, when one of the sections is hingedly turned for opening, the moving means located at the distal end of the section moves down, due to its weight, from the home position in the document scanning direction. Accordingly, the moving means has an indefinite initial position when the power is on. It is for the above reasons that the reset operation is required for the moving means when the power is on.

Usually, the reset operation, like the return operation as mentioned above, is performed at a relatively high speed. Therefore, this reset operation is accompanied by many problems similar to the above.

To solve those problems, various types of return speed control systems have been proposed. In a conventional return speed control system, the moving means is first moved at a high speed and is stopped at a point near the home position, and then is moved again at a low speed up to the home position. From the viewpoint of improving the copying speed, however, this control system is still defective in that it stops the moving means during its movement which afterwards must be slowed down.

SUMMARY OF THE INVENTION

Accordingly, an object of the present invention is to provide, by introducing a novel technical idea, a return speed control system for use in a document scanning apparatus with a moving means moving relative to a document for optical scanning, in which the moving means is quickly and smoothly returned to the home position from any position on its moving path.

According to the present invention, there is provided a return speed control system for use in a document scanning apparatus with a moving means moving relative to a document for optical scanning, comprising a first and second detecting means and a control means. When the moving means is moving backwards, the first means detects the return of the moving means to the first position or the initializing position. When the moving means is moving backwards, the second detecting means detects the return of the moving means to a second position separated by a predetermined distance from the first position in the scanning direction. According to the operation of the document scanning apparatus and the results of detection by the first and second detecting means, the control means can select a high speed backward mode, a low speed backward mode, or a stop mode in the moving means. The predetermined distance which defines the second position is approximately the coasting distance needed by the moving means due to the inertia of the moving means generated when the operation mode of the moving means is switched from a high-speed backward mode to a low-speed backward mode. In this way, the control means optimizes the return speed of the moving means according to its position.

Therefore, the return speed control system according to the present invention is free from the damage or distortion to the fixing portions of the moving means, which it realizes the quick and smooth return of the moving means.

BRIEF DESCRIPTION OF THE DRAWINGS

This and other objects and features of the present invention may be best understood by reference to the specification and accompanying drawings, in which:

FIG. 4 is a block diagram of a control circuit for a scanning motor in the FIG. 3 machine;

FIGS. 9(a)-9(e) and 10(a)-10(e) respectively are timing charts for explaining the operations of major portions of the circuits of FIGS. 3 and 4 circuits.

DETAILED DESCRIPTION OF THE PREFERRED EMBODIMENT

Figure 1:
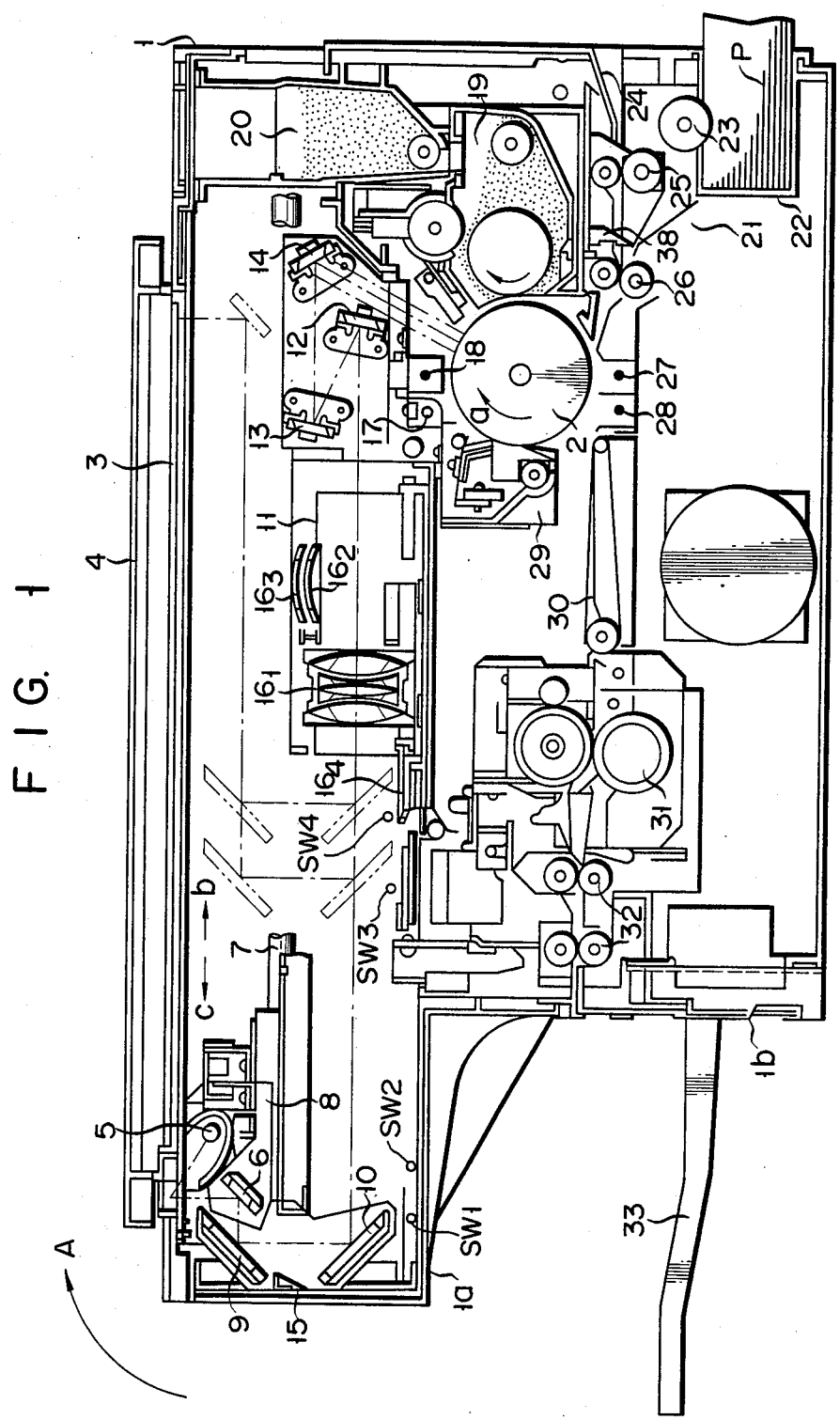
FIG. 1 shows a longidutinal sectional view of a copy machine incorporating as an embodiment according to the present invention.

An overall view of a copy machine into which a document table-fixed type of a document scanning apparatus according to the present invention is assembled, will be described referring to FIG. 1.

The main frame 1 of the copy machine contains a photosensitive drum 2 rotatable in an arrow direction a, which is located substantially at the center of the main frame 1. Fixed to the top of the main frame 1 is a document table 3 as a transparent glass plate, for example, to which a cover 4 is hingedly mounted. For setting or removing a document on or from the document table 3, one end is raised for opening with the other end as a fulcrum. An exposure lamp 5 and a mirror 6, which, together with a carriage 8, constitute a moving means, are provided under the document table 3. The exposure lamp 5 and the mirror 6 are mounted to a first carriage 8 which is reciprocatedly movable along a guide shaft 7 in arrow directions b and c. With the movement of the first carriage 8, the moving means optically and fully scans the document from one end to the other. Light emitted by the exposure lamp 5 and reflected from the document is led onto the surface of the photosensitive drum 2, through an optical path containing the mirror 6, mirrors 9 and 10, a lens unit 11, and fixed mirrors 12-14. By the optical system containing those optical components 5, 6, 9, 10, 11 and 12-14, pictorial information on the document is slit-imaged onto the photosensitive drum 2. The mirrors 9 and 10 are mounted to a second carriage 15, which moves with the first carriage 8 but at one-half of the speed of the first carriage 8. The lens unit 11 is comprised of a main lens $16_1$ movable in arrow directions b and c, and auxiliary lenses $16_2$-$16_4$ for changing the resultant focal distance of all of the lenses the alter a magnification. The auxiliary lenses $16_2$-$16_4$ are properly disposed on both sides of the main lens $16_1$. The first and second carriages 8 and 15 are driven by a single wire stretched through pulleys (not shown). The wire is driven by a scanning motor (not shown).

A quenching lamp 17 and a charger 18 are angularly disposed around the photosensitive drum 2 in the direction of its rotation. The quenching lamp 17 quenches the residual charges on the surface of the photosensitive drum 2. The charger 18 charges the surface of the photosensitive drum 2. The optical system projects the pictorial information of the document onto the surface of the photosensitive drum 2 to form an electrostatic latent image thereon. A developer 19, disposed downstream of the charger 18, develops the latent image on the drum surface by toner particles. Disposed above the developer 19 is a toner hopper 20 for supplying toner particles to the developer 19. A paper feed section 21 for feeding paper under the photosensitive drum 2 is disposed adjacent the developer 19. The paper feed section 21 is comprised of an auto feed cassette 22, a feed roller 23, a manual feed port 24, a feed roller pair 25, an aligning roller pair 26, and a manual start switch 38. The cassette 22 for holding a stack of copy paper P is removably set to the side of the main frame 1. The feed roller 23 takes out paper sheet by sheet from the cassette 22 for forward feeding. A manual feed port 24 is disposed above the cassette 22. Further, a manual-/auto feed cassette (not shown) capable of manual and cassette paper feeding is removably set to the side of the main frame 1 where the manual feed port 24 is also formed, with a paper feed mechanism (not shown) being provided in association with the manual/auto feed cassette. The feed roller pair 25 forwardly feeds the paper coming from the manual/auto feed cassette. The aligning roller pair 26 aligns the front end of a paper as fed from either of the above cassettes and feeds the paper to a transfer section. The manual start switch 38 is provided upstream of the aligning roller pair 26.

The transfer section provided ahead of the paper feed section 21 is comprised of a transfer charger 27 and a stripping charger 28. The transfer charger 27 transfers the toner image on the surface of the photosensitive drum 2 onto the paper as fed by the aligning roller pair 26. The stripping charger 28 picks off the transferred paper from the drum surface. A cleaning section 29 is provided around the drum 2 and adjacent to the stripping charger 28, and removes and collects residual toner on the surface of the photosensitive drum 2.

A transport section 30 for transporting the paper separated from the photosensitive drum 2 forward is located downstream of the stripping charger 28. A heat roller pair 31 located downstream of the transport section 30 fixes the transferred image on the paper. The paper bearing the fixed image thereon is discharged by an exit roller pair 32 to a tray 33 outside of the main frame 1.

The main frame 1 is composed of two separate frames, an upper frame 1a and a lower frame 1b. The upper frame 1a is hingedly coupled at one end with the lower frame 1b, and is turned up in an arrow direction A at a given angle, with the coupled end as a fulcrum. The upper frame 1a houses the photosensitive drum 2, the document table 3, the optical system, the charger 18, the developer 19, the upper rollers of the feed roller pair 25 and the aligning roller pair 26, the cleaning section 29, and the upper rollers of the heat roller pair 31 and the exit roller pair 32. The lower frame 1b houses the cassette 22, the feed roller 23, the lower rollers of the feed roller pair 25 and the aligning roller pair 26, the chargers 27 and 28, the transport section 30, the lower rollers of the heat roller pair 31 and the exit roller pair 32, and the tray 33.

Figure 2:
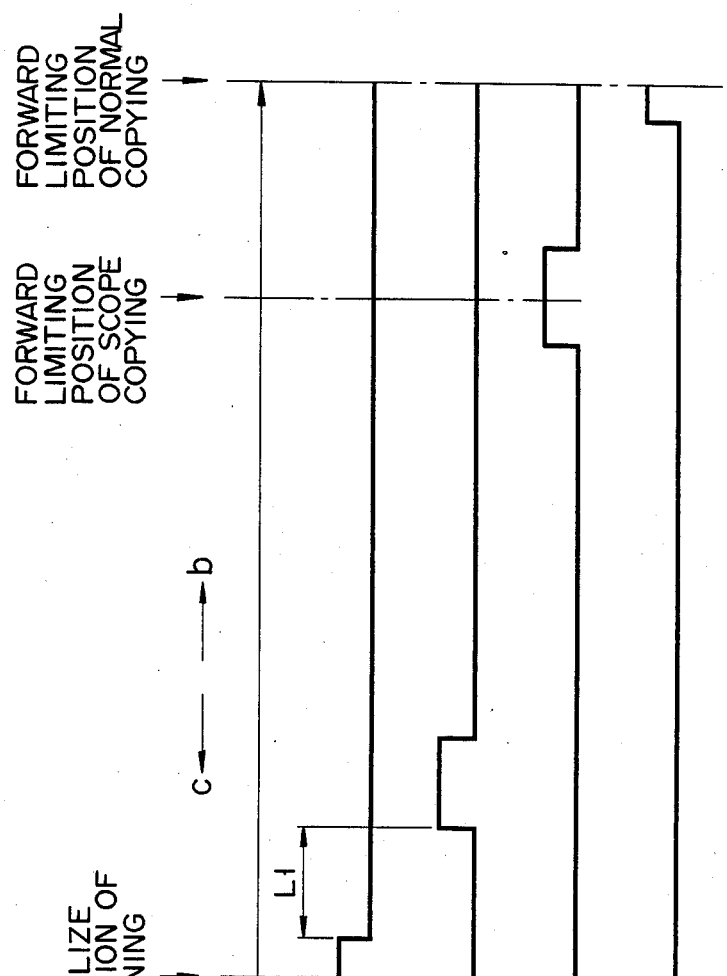
FIGS. 2(a)–2(e) show a timing chart describing the operation of carriage position detecting switches used in the copy machine FIG. 1.

Switches SW1–SW4 are provided on the moving path of the second carriage 15. Those switches turn on and off when the second carriage 15 moves and contacts the switches. Those switches operate as shown in FIGS. 2(b)–2(e) against the position of the carriage 15 as shown in FIG. 2(a). The switch SW1 detects the initializing position of the scanning (as indicated by a solid line in FIG. 1) of the second carriage 15 as shown in FIG. 2(b). The switch SW2 detects that the second carriage 15 has reached a position having a predetermined distance $L_1$ from the switch SW1, as shown in FIG. 2(c). The switch SW3 detects that the carriage has reached the forward limiting position of the scope of copying, as shown in FIG. 2(d). The switch SW4 detects that the carriage has reached a forward limiting position used in normal copying, as shown in FIG. 2(e).

Figure 3:
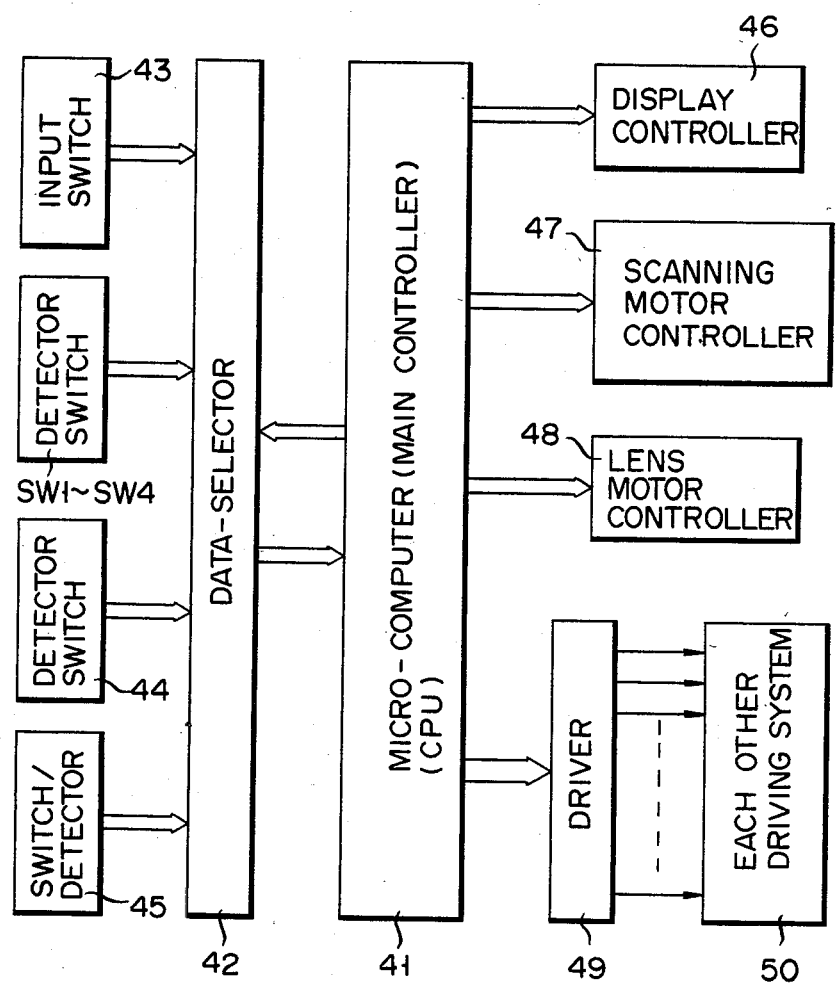
FIG. 3 shows a block diagram of an overall control system used in the copy machine of FIG. 1.

FIG. 3 shows the overall control system used in the copy machine. In the figure, a main controller 41 containing a microcomputer (referred to as a CPU) performs the overall control of the copy machine. The CPU 41 is connected at the input through a data selector 42 to an input switch 43 containing various types of keys provided on an operation panel (not shown), the switches SW1-SW4, a detector switch 44 for detecting the position of the main lens $16_1$, and other switch/detector 45. The CPU 41 is coupled at the output to a display controller 46 for controlling the display of various types of display units provided on the operation panel, a scanning motor controller 47 for driving the carriage, and a lens motor controller 48 for moving the main lens $16_1$. The CPU 41 is further connected through a driver 49 to a drive system 50 for driving the chargers, solenoids, clutch, etc.

FIG. 4 shows the details of the scanning motor controller 47. A scanning motor 51 can be a DC brush motor, for example, and its rotating speed is detected by a rotation detector 52. The rotation detector 52 produces an output signal of a frequency proportional to the rotating speed of the scanning motor 51. The output signal is wave shaped by a wave shaping circuit 53 and input to a counter 54. The counter 54 produces the signals having frequencies which are 1/1, ½ and ¼ against the frequency of the input signal. These three signals are applied to a signal selector 55. The signal selector 55, when the carriage moves forward, produces a signal having ½ or 1/1 frequency according to the moving speed determined by the copy magnification selected at that time. The ¼ frequency signal is produced for the high-speed backward mode of the caraige. The 1/1 frequency signal is produced for the low-speed backward mode of the carriage. The output signal A of a signal selector 55 is applied to a phase comparator 56. The phase comparator 56 detects the phase difference of the input signal and the signal B of a reference frequency, and produces an analog signal dependent on the phase difference and the polarity. The analog signal is applied to a pulse width modulating circuit 57 which in turn produces a signal with a pulse width corresponding to the analog voltage. The output signal from the pulse width modulating circuit 57 is applied to a scanning motor driver 58 for driving the scanning motor in a reversible manner. The drive voltage is applied to the scanning motor 51 during a period equal to the pulse width of the signal from the circuit 57. The effective value of the drive voltage applied to the motor 51 changes according to the pulse width of the output signal from the pulse width modulating circuit 57. With such a feedback loop, the rotating speed of the scanning motor 51 is controlled so as to be proportional to the reference signal B.

The reference signal B is the output signal of a signal selector 59. For the forward movement of the carriage, a signal C to be given later is selected. For the backward movement, a signal D of a fixed frequency produced from an oscillator 60 is selected. For forming the signal C, the output signal of a reference speed detector 61, which produces a signal of a frequency proportional to the rotating speed of the photosensitive drum 2, is wave shaped by a wave shaping circuit 62, and is multiplied by a frequency multiplier 63 of the PLL type into a signal having a frequency N times that of the original one. N is determined by the signal from a speed setting signal receiver 64 which receives a data signal of a plurality of bits serially transferred from the CPU 41 and converts it into a parallel data signal. More specifically, N is:

$$N = K/X$$

where X is a magnification (%) and K is a constant. In the above formula, K/X is rounded to a decimal point. Thus, the frequency multiplier 63 sets the scanning speed (moving speed of the carriage) according to copy magnification.

In brief, for the forward movement of the carriage, the scanning motor 51 is rotated at a speed proportional to a frequency N times the frequency proportional to the rotating speed of the photosensitive drum 2. For a high-speed backward movement, the scanning motor 51 is rotated in the reverse direction at a speed proportional to the oscillating frequency of the oscillator 60. For a low-speed backward movement, the motor 51 is rotated in the same direction as in the high speed backward movement, but at a speed ¼ that of the high speed backward movement.

The operation of the copy machine thus arranged will be described.

Figure 5A:
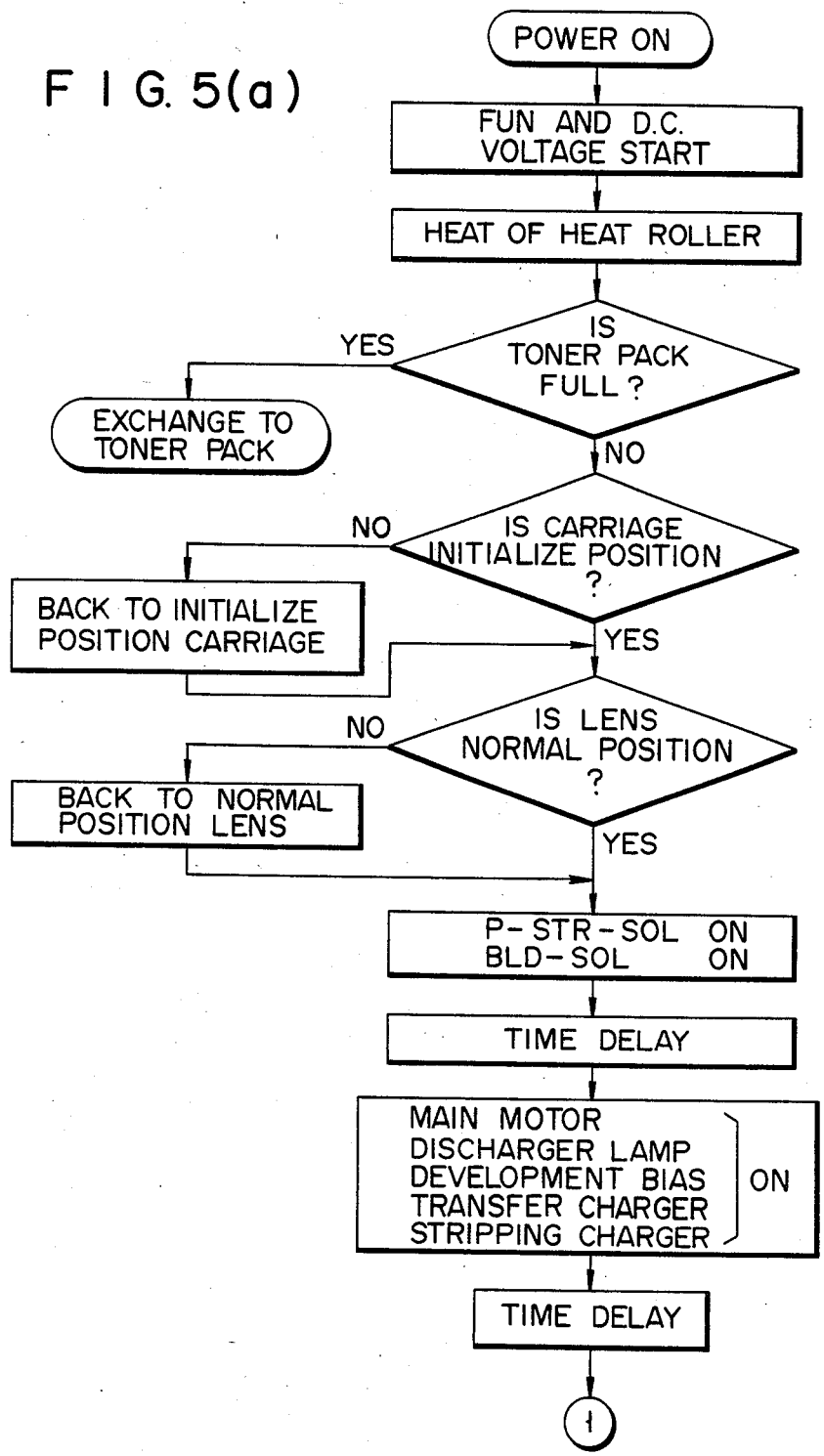
FIGS. 5(a) through 8 show flow charts useful in explaining the operations of the circuits of FIGS. 3 and 4.
Figure 5B:
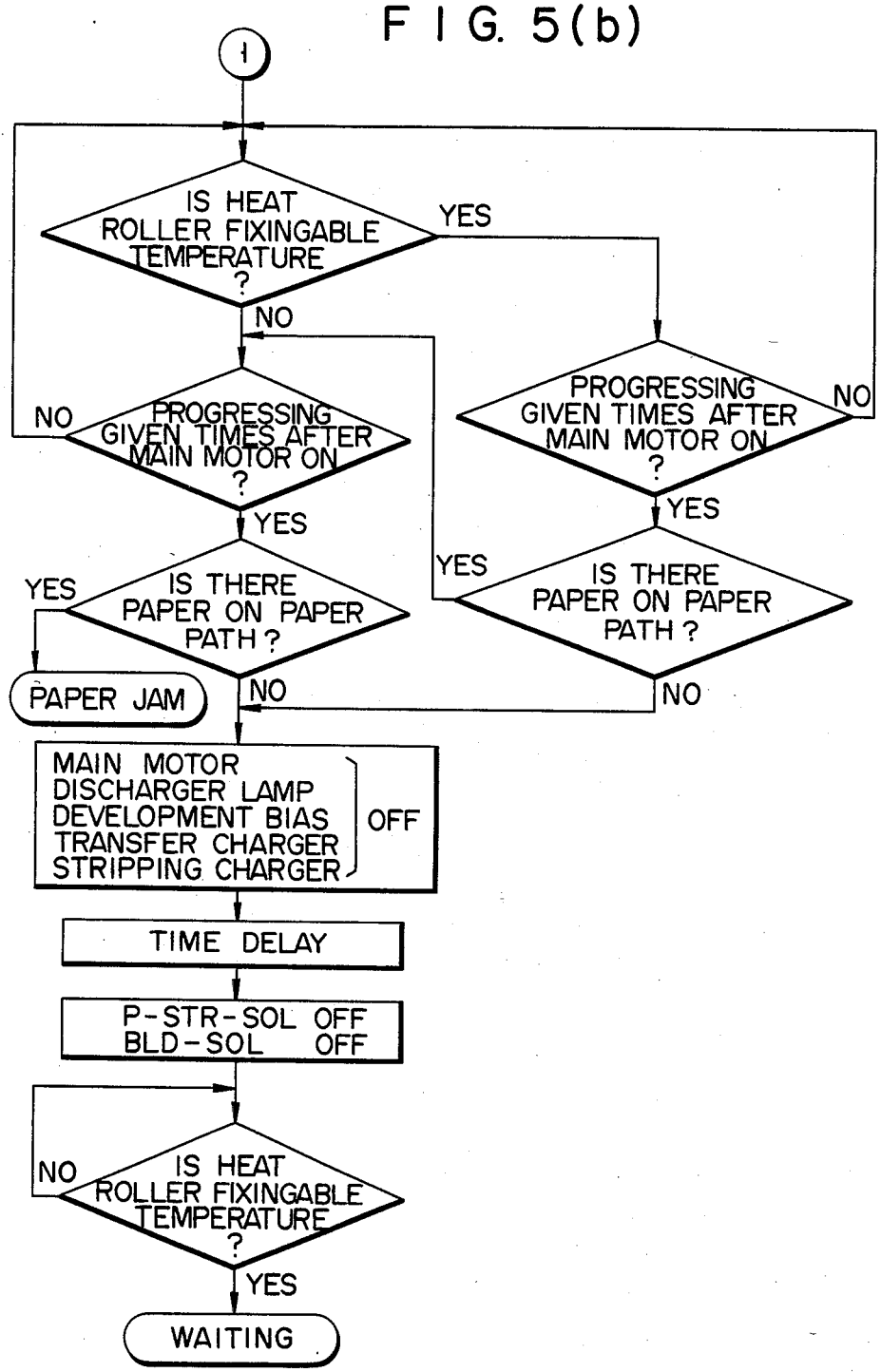

The operation of the copy machine from when the power is on to the ready-for-copy stage will be described referring to FIGS. 5(a) and 5(b) illustrating a flow chart. When the power is on, a ventilating fan (not shown) is driven to begin cooling the inside of the machine. At the same time, DC power is supplied to the control system. The heater associated with the heat roller pair 31 is turned on to heat the heat roller pair 31. Then, based on the operating state of a recovered toner fullness detector (not shown), the CPU 41 checks whether the recovered toner pack in the cleaning section 29 is full or not. If it is full, the fullness is indicated. If it is not full, the CPU 41 returns to a normal mode, and executes the following operation. The CPU 41 checks whether or not the carriage is at the scanning initializing position on the basis of the operating state of the switch SW1. If it is not there, the carriage is returned to the initializing position. Then, based on the operating state of the switch 44, the CPU 41 checks whether or not the main lens $16_1$ of the lens unit 11 is at a normal copying position or an initializing position. If it is not at a normal copying position, the main lens $16_1$ is returned to the normal copying position. Then, a paper start solenoid (P-STR-SOL) for controlling the aligning roller pair 26 and a blade solenoid (BLD-SOL) for controlling the cleaning blade in the cleaning section 29 are turned on. The aligning roller pair 26 is rotated and at the same time the cleaning blade is in press contact with the surface of the photosensitive drum 2. Upon completion of the press contact of the cleaning blade, turned on are the main motor, the quenching lamp 17, the developing bias, the transfer charger 27 and the stripping charger 28. This operating mode is called a forced paper discharge mode, and is continued for a given period, e.g., 7 seconds. In this mode, if paper is left on the paper transfer path in the machine, it is discharged to the tray 33. During this operating mode, the heat roller pair 31 is heated to a fusible temperature, and if the paper detector has not yet detected the paper on the paper transfer path, the forced paper discharge mode is terminated as the heat roller pair 31 is heated to the fusible temperature. If the paper remains on the paper transfer path at the end of the forced paper discharge mode, a paper jam is indicated. Then, the main motor, the quenching lamp 17, the developing bias, the transfer charger 27 and the stripping charger 28 are turned off. After the main motor stops, the blade solenoid (BLD-SOL) and the paper start solenoid (P-STR-SOL) are turned off. Subsequently, the copy machine waits till the fusible temperature of the heat roller pair 31 is reached, when it becomes in a copy ready mode.

Figure 6:
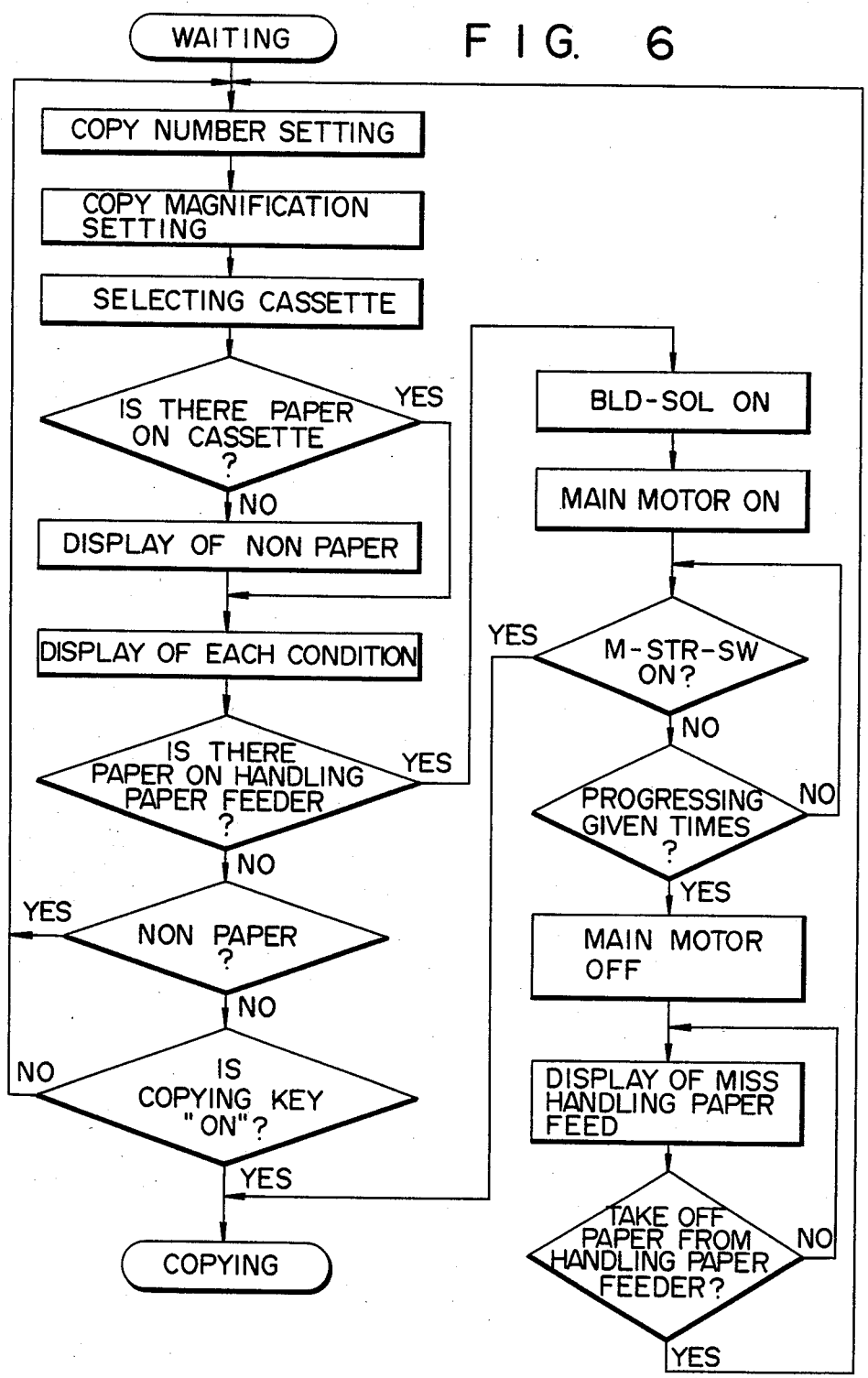

The copy ready mode which continues till the copy mode will be described referring to FIG. 6. In this mode, as a first step, a copy number setting, a copy magnification setting, and a cassette selection are accepted. At this time, if the manual/auto feed cassette is not set to the machine side, the auto feed cassette 22 is unconditionally selected. When the manual/auto feed cassette is set, the cassette 22 or the manual/auto feed cassette is alternately selected every time a feed select key on the operation panel is pushed. Following the cassette selection, it is checked whether or not paper is stacked in the selected cassette. If the checked result is NO or if no paper has been stacked in the selected cassette, the lack of paper is indicated. If the stack of paper is stored in or supplied to the cassette, various state indications or displays are performed. Then, it is checked whether or not paper has been inserted into the manual feed port 24. On the basis of the check result, it is determined whether the manual copy operation is executed or not. If the manual feed port 24 has paper, the blade solenoid is turned on, and the main motor is driven. At this time, the paper start solenoid is off. Accordingly, the feed roller pair 25 rotates, while the aligning roller pair 26 is at a standstill. Under this codition, the paper is sent up to the aligning roller pair 26 by the feed roller pair 25. When the manual start switch (M-STR-SW) 38 located upstream of the aligning roller pair 26 is turned on, the operation mode shifts to a copy mode to be given later. If the manual start switch 38 is not turned on even after a predetermined run of the main motor, something is wrong with copy machine. "Manual feed miss" is displayed to attract the operator's attention. At this time, the main motor is stopped. On the other hand, if no paper is contained in the manual feed port 24, it is checked whether the copy key is pushed or not. If the checked result is YES, the copy operation is executed. If NO, the CPU 41 returns to the step of the copy number setting and executes again the above steps.

Figure 7A:
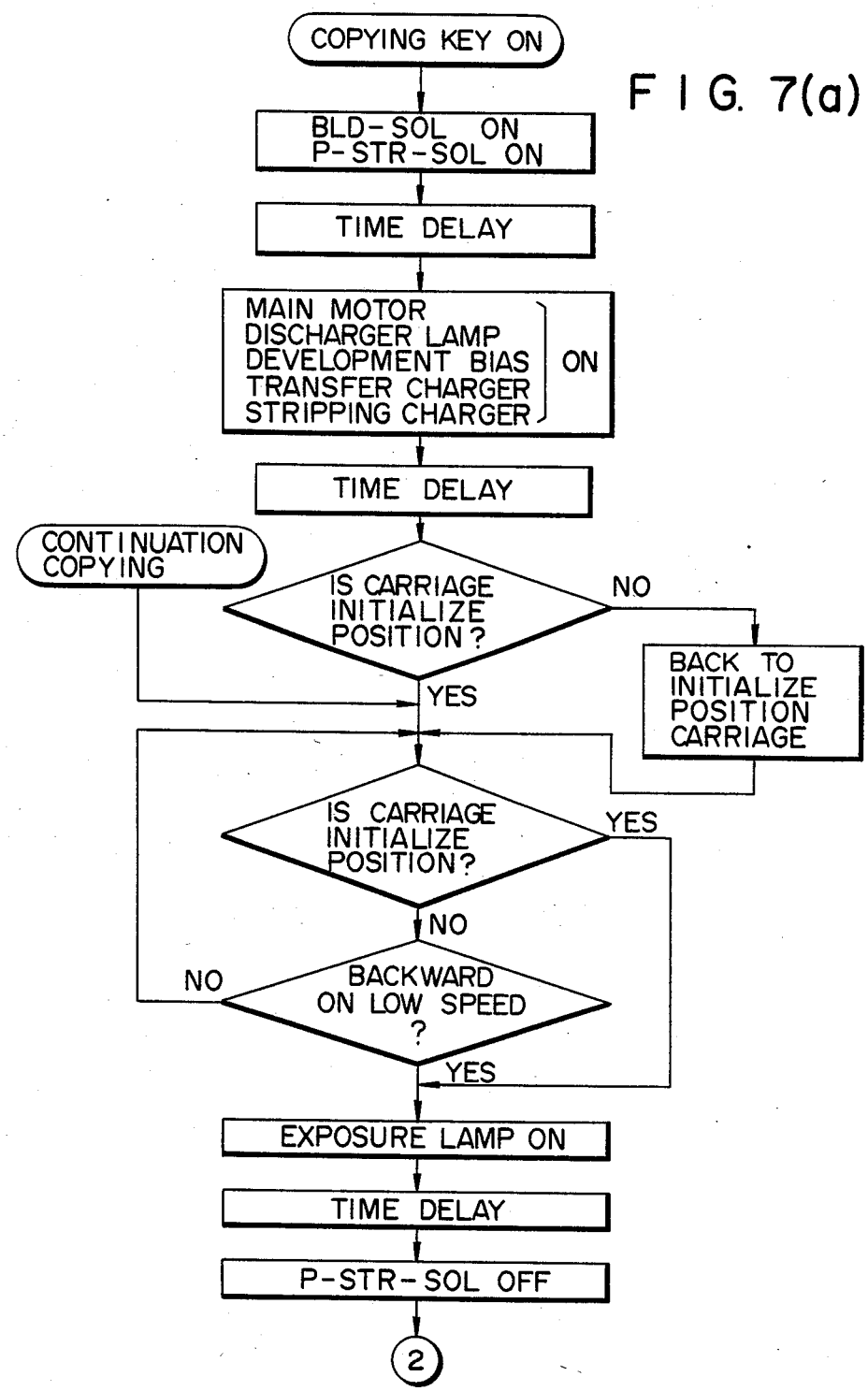
Figure 7B:
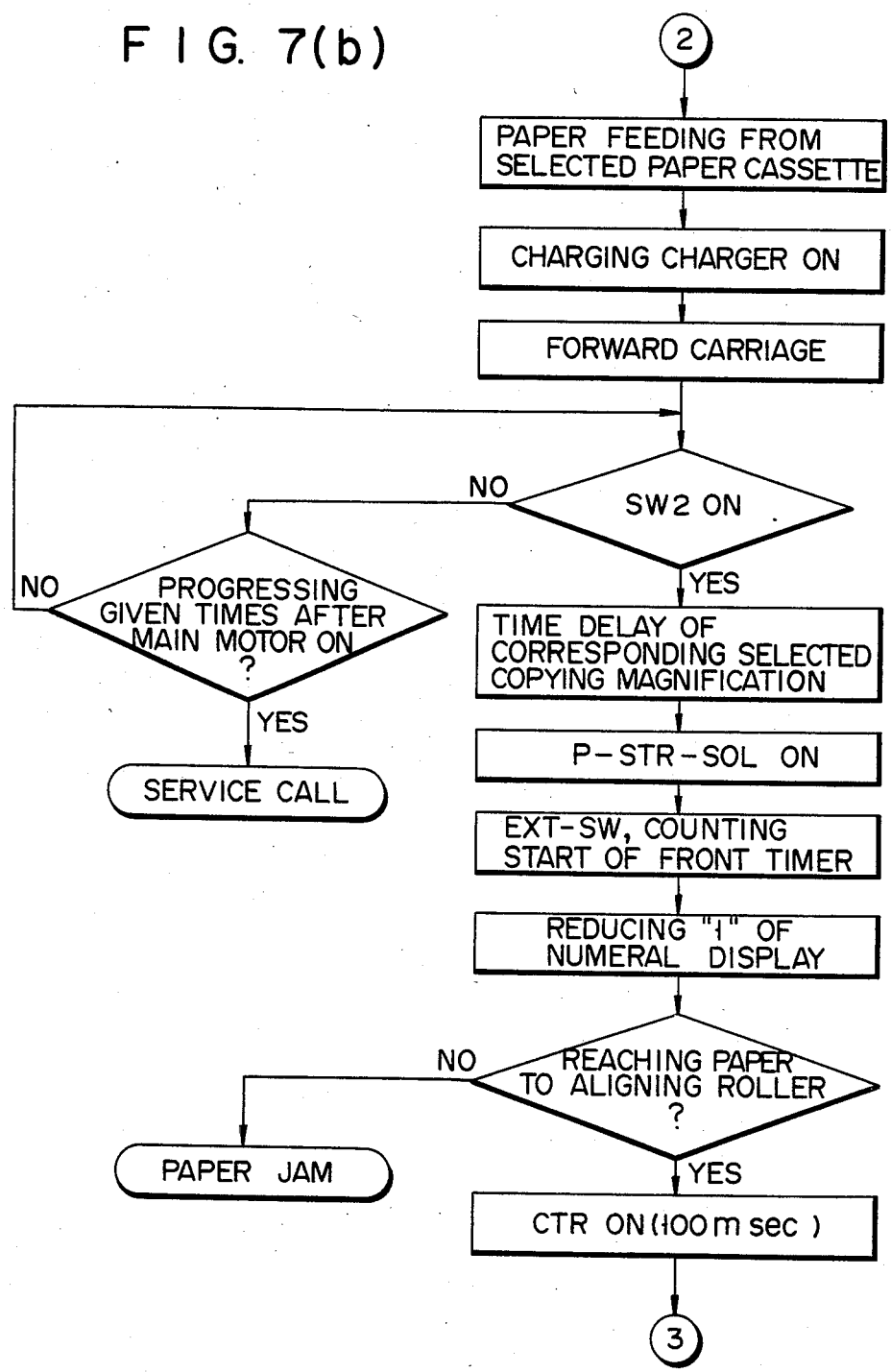

The copying operation will be described referring to FIGS. 7(a)-7(d). As shown in FIG. 7(a), the blade solenoid (BLD-SOL) and the paper start solenoid (P-STR-SO) are turned on to make the cleaning blade press contact with the drum surface. As the press contact of the cleaning blade is completed, the main motor, the quenching lamp 17, the developing bias, the transfer charger 27 and the stripping charger 28 are turned on. After a predetermined time elapses, the exposure lamp 5 lights. At this time, if the carriage is not at the initializing position, it is returned to the initializing position. After a further predetermined time has elapsed, the paper start solenoid (P-STR-SOL) is off, and at this time the aligning roller pair 26 stops. As shown in FIG. 7(b), paper is fed from the cassette selected, and is sent up to the aligning roller pair 26. Incidentally, in a manual feed copy mode, this paper feeding is not performed. Then, the charger 18 is turned on to charge the drum surface of the photosensitive drum 2. A carriage forward signal is issued to move the carriage in the arrow direction b in FIG. 1, and the scanning operation starts. The CPU 41 waits till the switch SW2 turns on. When the switch SW2 turns on, the paper start solenoid (P-STR-SOL) is turned on after a predetermined time has passed based on a copy magnification selected. The aligning roller pair 26 rotates to feed the paper to the transfer section. The paper is transported while an image on the drum surface is positionally aligned with the paper.

With the movement of the carriage, the document is progressively scanned. The light reflected from the document is projected onto the photosensitive drum 2, through the mirrors 6, 9 and 10; the lens unit 11; and the mirrors 12, 13, and 14. As a result, an electrostatic latent image of the pictorial information on the document is progressively formed on the photosensitive drum 2. The latent image is developed with toner particles applied thereto by the developer 19. The toner image is then transferred onto the paper. The paper bearing the transferred image is then separated from the drum surface by the stripping charger 28, and then is transported to the heat roller pair 31 by the transport section 30 where the transferred image is fused. The fused image-bearing paper is discharged to the tray 33 outside of the main frame 1 by the exit roller pair 32. The residual toner, left on the photosensitive drum 2 after the transfer step, is cleaned by the cleaning section 29. The cleaned drum 2 is then subjected to illumination by the quenching lamp 17, thereby quenching charges left thereon. Then, the photosensitive drum 2 is ready for the next image forming operation.

Figure 7C:
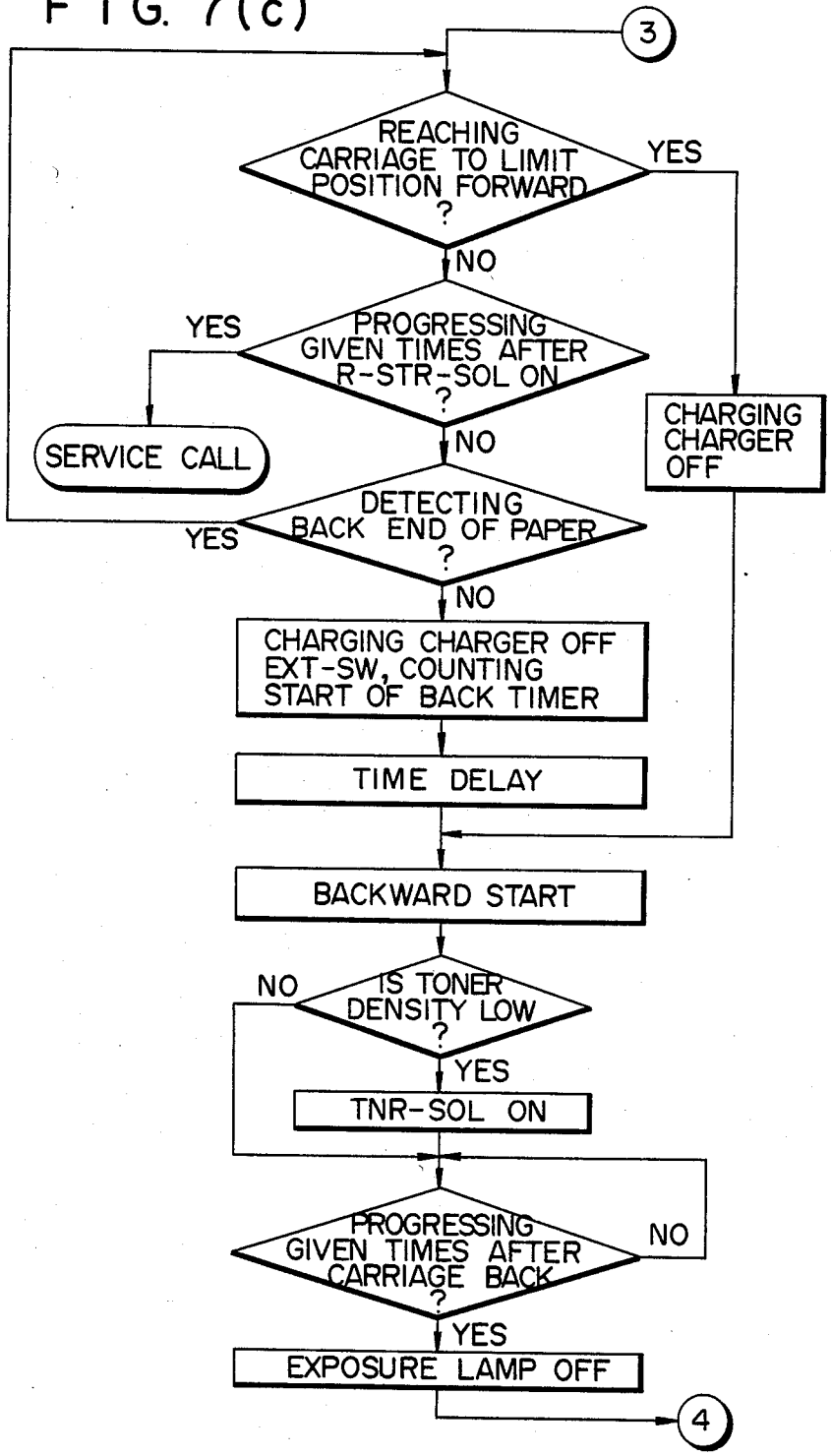

As shown in FIG. 7(c), the paper is transported by the aligning roller pair 26. When the paper sensor located upstream of the aligning roller pair 26 senses the back end of the paper, the charger 18 is turned off to stop the charging of the drum surface of photosensitive drum 2. After a predetermined time, a carriage backward signal is issued to move the carriage in the arrow direction c in FIG. 1 back to the initializing position. At this time, the toner density in the developer 19 is checked. If the toner density is low, a toner solenoid (TNR-SOL) for driving the toner supply mechanism of the toner hopper 20 is driven for a predetermined time, thereby supplying toner to the developer 19. After a predetermined time has elapsed since the carriage has advanced, the exposure lamp 5 is turned off. The carriage returns to the initializing position and stops there. For consecutively copying several sheets of paper, the sequence of operation beginning with the turning on of the exposure lamp 5 is repeated. The repeating operation begins when the carriage moves backward and the switch SW2 is turned on.

Figure 7D:
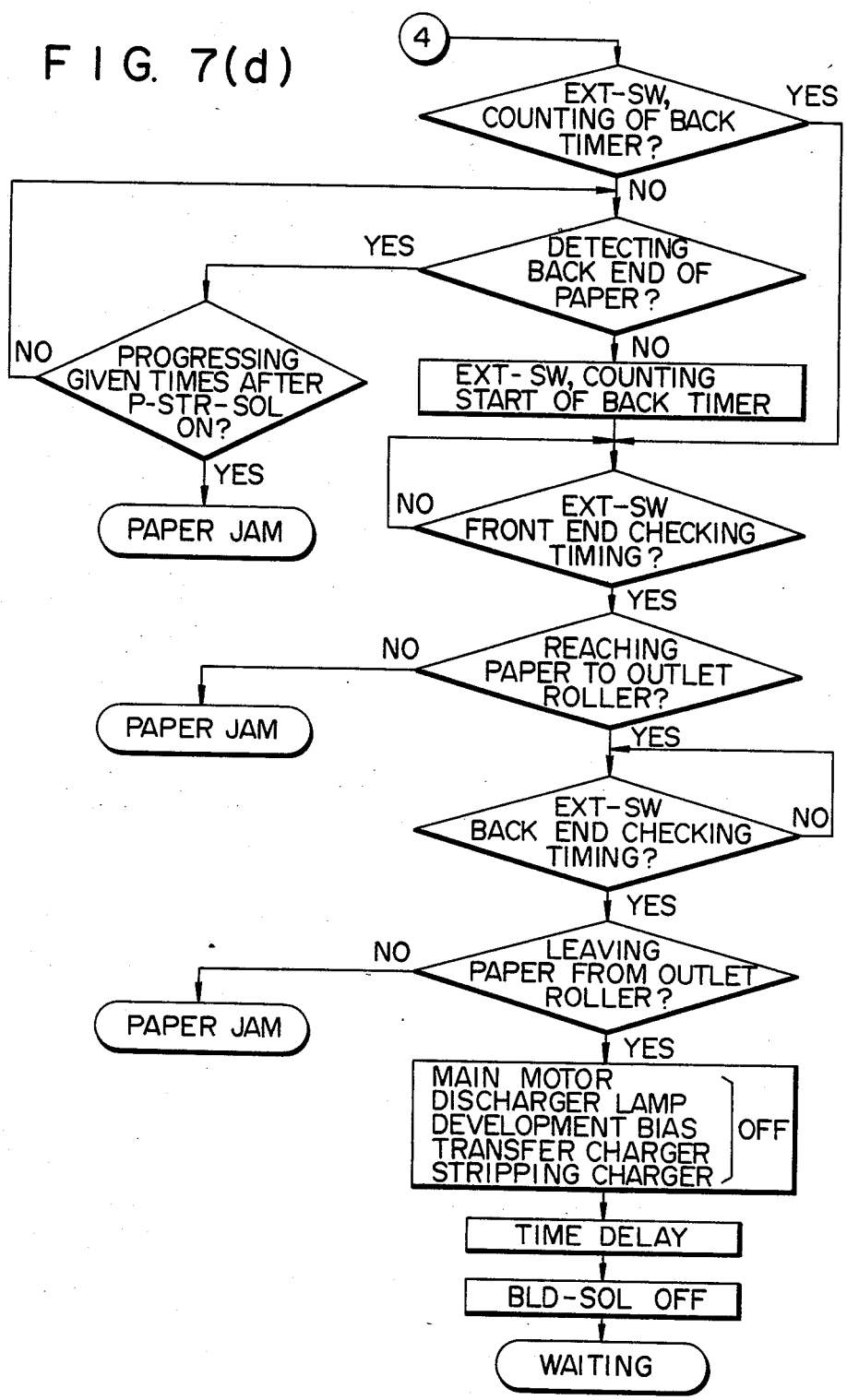

Following, as shown in FIG. 7(d), completion of the copying operation for one sheet or for several sheets, a check is performed to see if jamming has occurred on the basis of operating state of the exit switch (EXT-SW) located near the exit roller pair 32. If a paper jam is detected by this check, the paper jam is visually indicated. If it is not detected, the main motor, the quenching lamp 17, the developing bias, the transfer charger 27 and the stripping charger 28 are turned off. After a predetermined time, the main motor comes to a standstill, and the blade solenoid (BLD-SOL) is turned off. The machine is then in a waiting mode.

The control of the movement of the carriage which is essential to the present invention will be described. A CPU 41 sends to the scanning motor controller 47 2-bit data signals representing four modes, a forward mode, a high-speed backward mode, a low-speed backward mode, and a stop. The scanning motor controller 47 decodes each of those mode signals to drive the scanning motor 51 by the scanning motor driver 58. When the 2-bit data signal disappears between the CPU 41 and the scanning motor controller 47, the stop mode is set up from a safty viewpoint. The forward mode is set up only during the copying operation and is used for scanning the document. The speed of the forward movement is determined by the speed data computed by the CPU 41 using a magnification selected at that time. The speed data, in addition to the data signals, is transferred from the CPU 41 to the scanning motor controller 47.

The backward operation is classified into two types of operations. During the copying operation, following document the scanning, the CPU 41 first supplies a first control signal to the scanning motor controller 47. Upon receipt of this signal, a high-speed backward mode is set up to move the carriage at a high speed toward the initializing position. At this time, the backward speed is approximately two times the maximum forward speed, in order to speed up the copying operation. Under this condition, if a stop signal is applied, the length of the carriage run is relatively large since the inertia of the scanning motor and the carriage is present. Therefore, if the high speed drive for the carriage is continued till it reaches the vicinity of the initializing position, the carriage coasts to the movement limiting position due to inertia, even if the stop signal is issued. To avoid such a problem, the switch SW2 is positioned such that it turns on when the carriage returns and reaches a position where the carriage must run a slightly longer distance than the coast distance till it reaches the movement limiting position. When the switch SW2 is turned on in the high-speed backward mode, a second control signal is supplied from the CPU 41 to the scanning motor controller 47, thereby switching the high-speed backward mode to a low-speed backward mode. Subsequently, the carriage moves in the low-speed backward mode and reaches the initializing position, and the switch SW1 is turned on. At this time, the CPU 41 issues a third control signal to the scanning motor controller 47. Actually, the speed of the carriage, immediately after the switch SW2 is turned on, almost depends on the inertia and is higher than the speed in the low-speed backward mode. Then, the carriage gradually slows down to approach the initializing position. Thus, the low-speed backward drive is used only for supplementing the coast distance. Through the above control, the carriage smoothly and quickly coasts to the initializing position, and stops there (see the trailing edge of a waveform of FIG. 9(e)). Therefore, it is seen that the return speed control system under discussion is a very effective means of improving the copy speed.

The backward movement of the carriage is also performed in other situations than in the copying operation. The first is when the power is on. The second is when the copy magnification (scanning distance) is changed during a waiting mode of the copy machine. The lens unit 11 includes the main lens $16_1$ and the auxiliary lenses $16_2$–$16_4$, and is arranged as shown in FIG. 1 when the machine is in a normal copying mode. In a reduction copying mode, the main lens $16_1$ moves in the arrow direction b. With this movement, the auxiliary lenses $16_2$ and/or $16_3$ are positioned to overlap the main lens $16_1$ according to a copy magnification selected, thereby compensating for an optical path length. In an enlargement mode, the main lens $16_1$ moves in the arrow direction c so that the auxiliary lens $16_4$ overlaps the main lens $16_1$. In this case, the carriage can not reach the forward movement limiting position in the arrow direction b when the copy machine is in a normal copying mode. Before it reaches the limiting position, the mirror 10 contacts the auxiliary lens $16_4$. To prevent this, the limit switch SW3 is used, and operates such that in an enlargement mode, if the switch SW3 is turned on, the forward movement of the carriage is stopped. When a plurality of magnifications is selectively used, a corresponding number of limit switches is used to switch the forward movement limiting position or the upper limit of the scanning distance.

Figure 8:
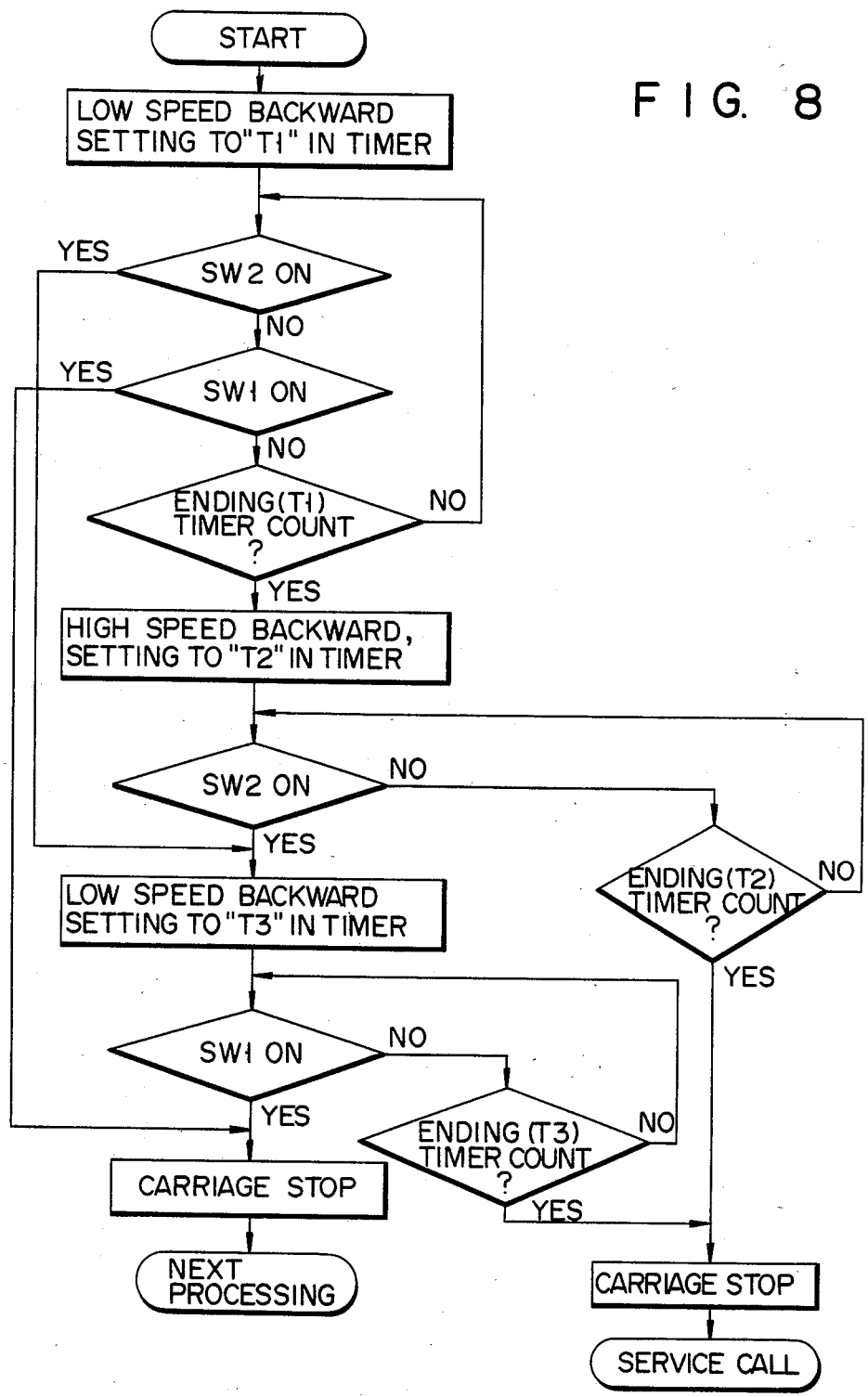

Assume now that the main lens $16_1$ is moved in the arrow direction c for changing the magnification for enlargement when the carriage is in the forward movement limiting position. In this case, the main lens $16_1$ contacts the mirror 10 during the course of the carriage movement. To prevent this, in this embodiment, the carriage is returned to the initializing position before the main lens $16_1$ is moved. The backward movement of the carriage is performed in the following manner. This will be described referring to FIG. 8, and to FIGS. 9 and 10. Since the position of the carriage is indefinite, the CPU 41 produces a fourth control signal to the scanning motor controller 47. With this signal, the carriage is moved in the arrow direction c. At this time, the CPU 41 sets a predetermined time $T_1$ for timer operation in a timer contained therein, simultaneously with the start of the low speed backward movement of the carriage, and begins the counting of it. With this backward motion, the carriage returns to the initializing position and the switch SW1 is on. In turn, the CPU 41 produces a fifth control signal to the scanning motor controller 47, and stops the carriage. At this time, the carriage is positioned between the switches SW2 and SW1. When neither the switch SW2 or the switch SW1 is turned on after the time $T_1$ elapses, that is, when the $T_1$ count by the counter is completed, the carriage is between the switches SW2 and SW4. Therefore, upon completion of the counting, the CPU 41 produces an eighth control signal to the scanning motor controller 47. By this control signal, the high-speed backward mode is set up. Subsequently, a low-speed backward mode and a stop mode are set up in order by ninth and tenth control signals similar to the second and third control signals in the backward mode during the copying operation. This operation is shown in FIGS. 9(a) to 9(e). The predetermined time T1 is expressed by:

$$T_1 = L_1 \times V_1 + \alpha$$

where $L_1$ is a distance between the switches SW1 and SW2, $V_1$ is a backward moving speed, and $\alpha$ is a marginal time. When the switch SW2 is turned on during the time period $T_1$, the CPU 41 issues a sixth control signal to the scanning motor controller 47. With this signal, the carriage is moved to the initializing position when the low-speed backward mode is continued. The low-speed backward mode returns the carriage to the initializing position, and the switch SW1 is turned on. At this time, the CPU 41 issues a seventh control signal to the scanning motor controller 47, thereby setting up the stop mode. Under this condition, the carriage is located at a position distanced by about $L_1$ maximum from the switch SW2 and between the switches SW3 and SW2. This operation is as shown in FIGS. 10(a) to 10(e). In this case, if the distance of the carriage from the switch SW2 is greater than $L_1$, the operation is similar to that shown in FIGS. 9(a) to 9(e). When a high-speed backward mode is set up after the count $T_1$ of the counter is completed and a low-speed backward mode is set up after the switch SW2 is turned on, the CPU 41 sets a predetermined time T$_2$ or T$_3$ for timer operation in a timer contained therein. If the switch SW2 or SW1 is not turned on after the count by the counter ends, the carriage is stopped and a service call for maintenance is generated. At this time, CPU 41 issues an eleventh or twelfth control signal to the controller 47.

As seen from the foregoing, in the return speed control system for the document scanning apparatus according to the present invention, the carriage is quickly moved to a position near the initializing position and then the coasting of the carriage due to its inertia is gradually slowed down. At the final stage, the carriage is moved at a low speed, and accurately stops at the initializing position. Therefore, if the carriage supporting the exposure lamp and the mirror is located at any position on its path, it can smoothly and accurately reach the initializing position. Therefore, the damage or distortion at the fixing portions of the exposure lamp and the mirror can reliably be prevented. This provides a quiet copy machine. Further, the waiting time is remarkably reduced when compared with a carriage return system in which the carriage is returned at a low speed from the start of return operation to the end or in which the carriage is first moved at a high speed, is temporarily stopped and is finally moved again at a low speed.

In the above-mentioned embodiment, the scanning motor is rotated at a fixed speed in a high-speed backward mode. Alternatively, only in a high-speed backward mode, the speed control is applied for the motor. In a low-speed backward mode, the motor is not speed controlled and is merely connected to the power source.

While the present invention is applied for the document table fixed type document scanning apparatus, the present invention is applicable for the document table moving type document scanning apparatus. In this case, the exposure lamp and the mirror are fixed, and the document table is moved.

It is evident that the present invention is applicable not only for the document scanning apparatus of a copy machine but also for that of a fascimile, electronic printer, a printing machine, etc.

As seen from the foregoing description, the present invention provides a return speed control system for use in a document scanning apparatus which can smoothly and quickly return the moving means such as the exposure lamp, the mirror or the document table to the initializing position, even if the moving means is located at any position on its path. Therefore, the return speed control system is free from damage or distortion by the moving means.

What is claimed is:

1. A return speed control system for use in a document scanning apparatus with a moving means moving relative to a document for optical scanning, comprising:

first detecting means for detecting the arrival of said moving means at a first position as an initializing position when said moving means is in a backward motion;

second detecting means for detecting the arrival of said moving means at a second position separated by a predetermined distance from said first position in the scanning direction when said moving means is in a backward motion; and control means for selectively setting up a high speed backward mode, a low speed backward mode, or a stop mode in said moving means according to an operating state of said document scanning apparatus and the results of the detections of said first and second detecting means; and said predetermined distance to define said second position being approximately a coasting distance of said moving means due to an inertia of said moving means generated when operation mode of said moving means is switched from said high-speed backward mode to said low-speed backward mode, whereby the return speed is optimized according to a position of said moving means.

2. The return speed control system according to claim 1, in which said first and second detecting means are switches at predetermined positions on a moving path of said moving means.

3. The return speed control system according to claim 1, in which the return speed of said moving means in said high-speed backward mode is about two times that in a scanning mode.

4. The return speed control system according to claim 1, in which the return speed of said moving means in said low-speed backward mode is about ¼ that in said high speed backward mode.

5. The return speed control system according to claim 1, in which said control means produces a first control signal to set up the high-speed backward mode in said moving means at the end of scanning operation by said document scanning apparatus, produces a second control signal to set up the low-speed backward mode in said moving means when said second detecting means detects the arrival of said moving means at said second position, which is moved by said first control signal, in the high-speed backward mode, and a third control signal to set up a stop mode in said moving means when said first detecting means detects the arrival of said moving means at said first position, which is moved by said second control signal, in the low-speed backward mode, whereby, over the most range in the moving path of said moving means from said second position to said first position, said moving means returns to near said first position at a speed which is dependent on an inertia of said moving means as generated when said moving means is in the high-speed backward mode and is higher than a speed as set for the low-speed backward mode, while said moving means gradually slows down, and over the remaining path said moving means goes back to a target position at the speed for the low speed backward mode.

6. The return speed control system according to claim 1, in which said control means produces to said moving means a fourth control signal to set up the low-speed backward mode in said moving means either when power is turned on or when a scanning distance is changed, sets a first timer operation of a predetermined time longer than that taken for said moving means to respond to said fourth signal to go back said predetermined distance in the low-speed backward mode, and selects one of said modes and sets up the seletected one in said moving means according to the first timer operation and the results of the detection of said first and second detecting means.

7. The return speed control system according to claim 6, in which said control means produces to said moving means a fifth control signal to set up the stop mode in said moving means when said first detecting means detects the arrival of said moving means at said first position in the low-speed backward mode before said first timer operation terminates.

8. The return speed control system according to claim 6, in which said control means produces to said moving means a sixth control signal to successively set up the low-speed backward mode in said moving means when said second detecting means detects the arrival of said moving means at said second position in the low-speed backward mode before said first timer operation terminates, and produces to said moving means a seventh control signal to set up the stop mode in said moving means when said first detecting means detects the arrival at said first position in the low-speed backward mode.

9. The return speed control system according to claim 6, in which said control means produces to said moving means an eighth control signal to set up the high-speed backward mode in said moving means when said second detecting means does not detect the arrival of said moving means at said second position, which is moved by said fouth control signal, in the low-speed backward mode after said first timer operation terminates, produces to said moving means a ninth control signal to set up the low-speed backward mode in said moving means when said second detecting means detects the arrival of said moving means at said second position, which is moved by said eighth control signal, in the high-speed backward mode, and produces to said moving means a tenth control signal to set up the stop mode in said moving means when said first detecting means detects the arrival at said first position, which is moved by said ninth control signal, in the low-speed backward mode.

10. The return speed control system according to claim 6, in which said control means sets a second timer operation after said first timer operation terminates, and stops said moving means and produces an eleventh control signal to inform an abnormality when said second detecting means does not detect the arrival of said moving means at said second position after said second timer operation terminates.

11. The return speed control system according to claim 6, in which said controlling means sets a third timer operation after the detecting operation by said second detecting means terminates, and stops said moving means and produces a twelfth signal to inform an abnormality when said moving means detects the arrival of said moving means at said first position after said third timer operation terminates.

* * * * *